(12) United States Patent
Hogiri et al.

(10) Patent No.: US 12,406,813 B2
(45) Date of Patent: Sep. 2, 2025

(54) ELECTROLYTIC CAPACITOR

(71) Applicant: Panasonic Intellectual Property Management Co., Ltd., Osaka (JP)

(72) Inventors: Masayuki Hogiri, Osaka Fu (JP); Yuki Ueda, Osaka Fu (JP); Hitoshi Ishimoto, Hyogo Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 280 days.

(21) Appl. No.: 18/249,335

(22) PCT Filed: Oct. 19, 2021

(86) PCT No.: PCT/JP2021/038513
§ 371 (c)(1),
(2) Date: Apr. 17, 2023

(87) PCT Pub. No.: WO2022/091854
PCT Pub. Date: May 5, 2022

(65) Prior Publication Data
US 2023/0402233 A1  Dec. 14, 2023

(30) Foreign Application Priority Data

Oct. 28, 2020 (JP) .................... 2020-180484
Oct. 28, 2020 (JP) .................... 2020-180485

(51) Int. Cl.
*H01G 9/042* (2006.01)
*H01G 9/048* (2006.01)
*H01G 9/15* (2006.01)

(52) U.S. Cl.
CPC ............ *H01G 9/042* (2013.01); *H01G 9/048* (2013.01); *H01G 9/15* (2013.01)

(58) Field of Classification Search
CPC .......... H01G 9/042; H01G 9/048; H01G 9/15
See application file for complete search history.

(56) References Cited

U.S. PATENT DOCUMENTS

| 4,646,197 A * | 2/1987 | Wong ............... H01G 9/012 72/274 |
| 2005/0237698 A1* | 10/2005 | Postage ............. H01G 9/012 361/533 |

(Continued)

FOREIGN PATENT DOCUMENTS

| CN | 101981639 A | 2/2011 |
| CN | 105914039 A | 8/2016 |

(Continued)

OTHER PUBLICATIONS

International Search Report dated Nov. 22, 2021 issued in International Patent Application No. PCT/JP2021/038513, with English translation.

(Continued)

*Primary Examiner* — Timothy J. Dole
(74) *Attorney, Agent, or Firm* — Rimon P.C.

(57) ABSTRACT

An electrolytic capacitor includes a capacitor element including a porous anode body, an anode wire partially embedded in the anode body, a dielectric layer formed on a surface of the anode body, and a solid electrolyte layer covering at least a portion of the dielectric layer, wherein the anode body is formed of a first metal, the anode wire is formed of a second metal having a different composition from the first metal, and the second metal has a conductivity S2 that is larger than a conductivity S1 of the first metal. This allows for providing an electrolytic capacitor which suppresses an increase in production costs and has a low ESR.

19 Claims, 5 Drawing Sheets

(56) References Cited

U.S. PATENT DOCUMENTS

| | | | |
|---|---|---|---|
| 2011/0019341 A1 | | 1/2011 | Umemoto et al. |
| 2011/0032662 A1 | * | 2/2011 | Ihara .................... H01G 9/0029 |
| | | | 29/25.03 |
| 2016/0372268 A1 | | 12/2016 | Naito et al. |
| 2018/0137986 A1 | * | 5/2018 | Vilc ..................... H01G 9/0036 |
| 2022/0344105 A1 | * | 10/2022 | Tsubaki ................ H01G 9/055 |

FOREIGN PATENT DOCUMENTS

| | | | |
|---|---|---|---|
| JP | 57154141 U | * | 9/1982 |
| JP | S57-154141 U | | 9/1982 |
| JP | H03-272124 A | | 12/1991 |
| JP | H04-159705 A | | 6/1992 |
| JP | H05-228527 A | | 9/1993 |
| JP | 2012059910 A | * | 3/2012 |
| JP | 2016-507166 A | | 3/2016 |
| JP | 2019145726 A | * | 8/2019 |
| WO | 2014/130500 A1 | | 8/2014 |
| WO | 2014/203816 A1 | | 12/2014 |

OTHER PUBLICATIONS

Chinese Office Action with partial English translation dated Feb. 14, 2025 issued in the corresponding Chinese Patent Application No. 202180072057.0.

* cited by examiner

ELECTROLYTIC CAPACITOR

CROSS-REFERENCE OF RELATED APPLICATIONS

This application is the U.S. National Phase under 35 U.S.C. § 371 of International Patent Application No. PCT/JP2021/038513, filed on Oct. 19, 2021, which in turn claims the benefit of Japanese Patent Application No. 2020-180484, filed on Oct. 28, 2020, and Japanese Patent Application No. 2020-180485, filed on Oct. 28, 2020, the entire disclosures of which Applications are incorporated by reference herein.

TECHNICAL FIELD

The present invention relates to an electrolytic capacitor.

BACKGROUND ART

Recently, developments have been progressing for a solid electrolytic capacitor with a small equivalent series resistance (ESR) and excellent frequency characteristics. The solid electrolytic capacitor has a porous anode body, a dielectric layer formed on the anode body surface, and a solid electrolyte layer covering at least a portion of the dielectric layer.

For the anode body, a sintered product of a molded body of metal particles is used. The molded body is produced, usually, by disposing an anode wire at a predetermined position of a mold, and introducing metal particles to the mold, and press-molding.

Patent Literature 1 describes a capacitor including a fluted anode, an anode wire extending from the fluted anode, and a dielectric on the fluted anode, and a conformal cathode on the dielectric, and a plating metal layer on the carbon layer.

CITATION LIST

Patent Document

Patent Literature 1: Japanese Translation of PCT International Application Publication No. 2016-507166

SUMMARY OF THE INVENTION

Problem to be Solved by the Invention

Use of the fluted anode described in Patent Literature 1 is advantageous in reduction in ESR, but to produce the fluted anode, a production device with a complicated mold and a mechanism is necessary, which greatly increases production costs.

The present disclosure aims to provide an electrolytic capacitor with a low ESR while suppressing the increase in production costs.

Means for Solving the Problem

An aspect of the present disclosure relates to an electrolytic capacitor including a capacitor element including a porous anode body, an anode wire partially embedded in the anode body, a dielectric layer formed on a surface of the anode body, a solid electrolyte layer covering at least a portion of the dielectric layer, wherein the anode body is formed of a first metal, the anode wire is formed of a second metal having a different composition from the first metal, and the second metal has a conductivity S2 that is larger than a conductivity S1 of the first metal.

Another aspect of the present disclosure relates to an electrolytic capacitor including a capacitor element including a porous anode body, an anode wire partially embedded in the anode body, a dielectric layer formed on a surface of the anode body, and a solid electrolyte layer covering at least a portion of the dielectric layer, wherein the anode body is formed of a first metal, the anode wire has a core part, and a surface layer portion covering at least a portion of the core part, the core part is formed of a second metal having a different composition from the first metal, the surface layer portion is formed of a third metal having a different composition from the second metal, the third metal includes a common constituting element with the first metal, or includes a constituting element capable of forming an all-proportional solid solution type alloy with the constituting element of the first metal.

Effects of the Invention

The present disclosure can provide an electrolytic capacitor which suppresses an increase in production costs and has a low ESR.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE EMBODIMENTS

Hereinafter, embodiments of the present disclosure will be described in more detail based on examples, but the present disclosure is not limited to the examples described below. In the description below, specific numeral values and materials are given as examples, but other numeral values and materials can be used as long as effects of the present disclosure can be achieved. For the elements other than characteristic portions of the present disclosure, known electrolytic capacitor elements can be used. In this specification, when referring to a "range of numeral value A to numeral value B", the range includes the numeral value A and the numeral value B.

Embodiment 1

Embodiment 1 of the present disclosure is described.
[Electrolytic Capacitor]

An electrolytic capacitor of Embodiment 1 of the present disclosure includes a capacitor element including a porous anode body, an anode wire partially embedded in the anode body, a dielectric layer formed on a surface of the anode body, and a solid electrolyte layer covering at least a portion of the dielectric layer. The electrolytic capacitor may include an anode lead terminal and a cathode lead terminal electrically connected to the capacitor element, and an external resin disposed around the capacitor element. The capacitor element is divided into an anode portion and a cathode portion. The anode body and the anode wire form the anode portion. The anode lead terminal is connected to the anode wire. The solid electrolyte layer forms the cathode portion. The cathode portion may include a cathode layer covering at least a portion of the solid electrolyte layer. The cathode portion configuration is not particularly limited, and it may be a known cathode portion, or a cathode portion having a configuration equivalent thereto. The cathode lead terminal is connected to the cathode portion through an electrically conductive member. The shape and the size of the capacitor element are not particularly limited, and a known capacitor element or a capacitor element having a configuration equivalent thereto may be used.

(Anode Body)

The porous anode body is a sintered product of a molded body of particles, and is formed of metal. The anode body is formed by forming particles of the materials, and sintering the molded body. Examples of the material particles include metal particles, alloy particles, and metal compound particles. For the particles, one type may be used singly, or two or more types may be used in combination.

In this embodiment, the metal forming the anode body (i.e., sintered product) is defined as a first metal, and the first metal conductivity is named a conductivity S1. The first metal may be composed of a single metal element, or may be composed of two or more constituting elements. The anode body formed of the first metal may include a component other than the first metal, but for example, 90 mass % or more, or even 95 mass % or more of the anode body is formed of the first metal.

For the first metal, a valve metal such as aluminum (Al), titanium (Ti), tantalum (Ta), niobium (Nb), zirconium (Zr), and hafnium (Hf) are used. In particular, for the first metal, at least one of Ta and Nb is used, or more preferably at least Ta is used. 50 mass % or more of the anode body may be Ta, 70 mass % or more, or 80 mass % or more of the anode body may be Ta, or the anode body may be entirely Ta other than impurities. The first metal may be an alloy of Ta and Nb.

The anode body may be produced based on the method below. First, a portion of the anode wire is embedded in particles of a material of the anode body, and the particles are press-molded into a shape of a column or a cuboid. Afterwards, the produced molded body is sintered, thereby forming an anode body in which the anode wire is partially embedded.

(Anode Wire)

The anode wire is formed of metal. The anode wire is partially embedded in the anode body, and the remainder is projected from the anode body. The anode wire has a rod shape. The distal end of the anode wire projected from the anode body may have a cross sectional shape that is different from other portions.

In this embodiment, the metal forming the anode wire is defined as a second metal, and the second metal conductivity is named a conductivity S2. The second metal has a different composition from the first metal. The second metal may be composed of a single metal element, or may be composed of two or more constituting elements. The anode wire formed of the second metal may include a component other than the second metal, but for example, 90 mass % or more, or even 95 mass % or more of the anode wire is formed of the second metal.

Here, "different composition from" means that the constituting element and the content of the first metal do not match the constituting element and the content of the second metal. That is, when it has a "different composition", it includes a case where the constituting element of the first metal does not match the constituting element of the second metal (not overlapping, but complete match), and a case where the constituting element of the first metal matches the constituting element of the second metal but the amount of the constituting element contained in the first metal is different from the amount of the constituting element contained in the second metal.

The second metal forming the anode wire has a conductivity S2 larger than the conductivity S1 of the first metal forming the anode body (S2>S1). With S2>S1, the ESR of the electrolytic capacitor significantly decreases. Also, with S2>S1, material costs of the anode wire can be suppressed, and processing (cutting, compressing, etc.) loads can be reduced. Thus, productivity of the electrolytic capacitor improves. That is, with S2>S1, while suppressing the production costs of the electrolytic capacitor, an electrolytic capacitor with a low ESR can be provided.

The ESR can be reduced also with a thicker anode wire. However, with a thicker anode wire, in addition to higher material costs, processing load of the anode wire increases even more, and productivity of the electrolytic capacitor is reduced.

Also, a longer length Lw of the portion of the anode wire embedded in the anode body can also reduce the ESR. However, in that case, the anode wire has to be formed even longer, which increases the material costs.

The ratio of the conductivity S2 to conductivity S1: S2/S1 may be, for example, 1.5 or more, 2.0 or more, or 2.4 or more. With a larger S2/S1, the ESR of the electrolytic capacitor can be easily reduced. Also, by making the anode wire even thinner, or shorter, the productivity of the electrolytic capacitor can be easily improved.

For the second metal, the above-described valve metal, and tungsten (W), molybdenum (Mo) are used. In particular, for the second metal, at least one of W and Mo is preferably used, and at least W is used preferably. 50 mass % or more of the anode wire may be W, 70 mass % or more, or even 80 mass % or more of the anode wire may be W, or the anode wire may be entirely W other than impurities. W is low in cost, and a highly conductive thin wire can achieve a low ESR, and therefore processing load can be made small. The second metal may be an alloy of W and Mo.

In a preferable embodiment, the first metal includes at least Ta and the second metal includes at least W. The conductivity of W is at least two times bigger than that of Ta. By combining the anode body including Ta with the anode wire including W, the ESR can be significantly reduced. The anode wire including W also contributes to achieving a high capacity electrolytic capacitor. In a preferable embodiment, the anode portion includes an anode body with 90 mass % or more of Ta and the anode wire with 90 mass % or more of W. W is low in costs more significantly compared with Ta, and the processing load can be reduced more easily than Ta.

The constituting element of the first metal and the constituting element of the second metal may be capable of forming an all-proportional solid solution type alloy. In this case, the bond between the anode body and anode wire can be made strong. The stronger bond between the anode body and anode wire is advantageous in reduction in the ESR. The solid solution is formed when the molded body of particles is sintered in the anode body production process.

The second metal may have a melting point of 1500° C. or more. In this manner, deformation from heat of the anode wire can be suppressed. In the anode body production process, the temperature for sintering the molded body of particles is, for example, 1450° C. or less.

(Dielectric Layer)

The dielectric layer formed on the anode body surface is not particularly limited, and it can be formed by a known method. For example, the dielectric layer can be formed by anodizing the anode body and allowing an oxide film to grow on the anode body surface. The anodizing treatment can be performed by immersing the anode body in the anodizing solution and anodizing the anode body surface. Alternatively, the anode body can be heated under an atmosphere including oxygen to oxidize the anode body surface.

(Electrolyte Layer)

The electrolyte layer is not particularly limited, and an electrolyte layer used in a known solid electrolytic capacitor may be used. In this specification, the electrolyte layer can be read as the solid electrolyte layer, and the electrolytic capacitor can be read as the solid electrolytic capacitor. The electrolyte layer may be a laminate of two or more different electrolyte layers.

The electrolyte layer is disposed so as to cover at least a portion of the dielectric layer. The electrolyte layer may be formed by using a manganese compound or conductive polymer. The conductive polymer may be a π conjugated polymer, and examples of the conductive polymer include polypyrrole, polythiophene, polyaniline, and derivatives thereof. These may be used singly, or may be used in combination. The conductive polymer may be a copolymer of two or more monomers. The derivative of the conductive polymer means a polymer with a conductive polymer as a basic skeleton. Examples of the derivative of polythiophene include poly(3,4-ethylene dioxy thiophene).

Preferably, a dopant is added to the conductive polymer. The dopant can be selected in accordance with the conductive polymer, and a known dopant may be used. Examples of the dopant include naphthalene sulfonic acid, p-toluene sulfonic acid, polystyrene sulfonic acid, and a salt thereof. An example of the electrolyte layer is formed by using poly(3,4-ethylene dioxy thiophene) (PEDOT) doped with polystyrene sulfonic acid (PSS).

The electrolyte layer including the conductive polymer is formed on at least a portion of the dielectric layer by a method of immersing the dielectric layer with a monomer or oligomer, and thereafter, polymerizing the monomer or oligomer with chemical polymerization or electropolymerization, or a method of immersing the anode body in which the dielectric layer is formed in a solution or dispersion liquid of the conductive polymer (and as necessary dopant), and drying.

(Cathode Layer)

The cathode layer may be a conductive layer formed on the electrolyte layer, and for example, may be a conductive layer formed to cover the electrolyte layer. The cathode layer may include a carbon layer formed on the electrolyte layer, and a metal paste layer formed on the carbon layer. The carbon layer may be formed of an electrically conductive carbon material such as graphite and resin. The metal paste layer may be formed of metal particles (e.g., silver particles) and resin, and may be formed, for example, of a known silver paste.

(Electrically Conductive Member)

The cathode layer is connected to a connection portion of a cathode lead terminal through an electrically conductive member. That is, the cathode layer (cathode portion) is electrically connected to the cathode lead terminal. The electrically conductive member is formed of a material with electrical conductivity. The electrically conductive member may be formed by using a material including metal particles (e.g., silver particles) and resin, or may be formed by using, for example, a known metal paste (e.g., silver paste). By heating the metal paste, an electrically conductive member is formed. The electrically conductive member may be formed of a plurality of different types of conductive layer.

(Outer Resin)

The outer resin is disposed around the capacitor element at the surface of the electrolytic capacitor so as not to expose the capacitor element. Furthermore, the outer resin insulates the anode lead terminal and cathode lead terminal. For the outer resin, a known outer resin used for electrolytic capacitors may be used. For example, the outer resin may be formed by using an insulative resin material used for sealing a capacitor element. The outer resin may be formed by introducing an uncured thermosetting resin and a filler into a mold and curing with a transfer molding method, compression molding method, and the like, with the capacitor element accommodated in the mold.

Examples of the outer resin include epoxy resin, phenol resin, silicone resin, melamine resin, urea resin, alkyd resin, polyurethane, polyimide, and unsaturated polyester. The outer resin may include a material other than resin (inorganic filler, etc.).

(Cathode Lead Terminal)

A portion of the cathode lead terminal is exposed from the outer resin, and is used as a cathode external terminal. The material of the cathode lead terminal may be a material that can be used for a cathode lead terminal of electrolytic capacitors. For example, a material of a known cathode lead terminal used for electrolytic capacitors may be used. The cathode lead terminal may be formed by processing a metal sheet (including metal plate and metal foil) formed of metal (copper, copper alloy, etc.) with a known metal processing method.

(Anode Lead Terminal)

A portion of the anode lead terminal is exposed from the outer resin, and is used as an anode external terminal. The material of the anode lead terminal may be a material that can be used for an anode lead terminal of electrolytic capacitors. For example, a material of a known anode lead terminal used for electrolytic capacitors may be used. The anode lead terminal may be formed by processing a metal sheet (including metal plate and metal foil) formed of metal (copper, copper alloy, etc.) with a known metal processing method.

Figure 1:
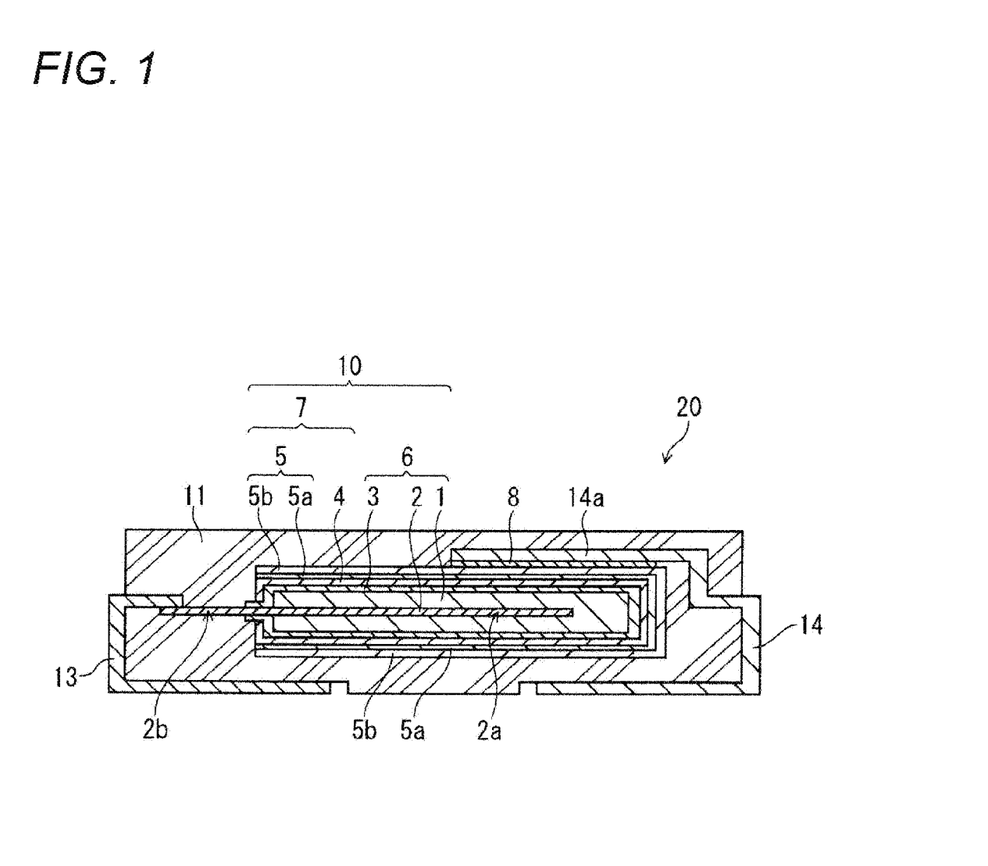
FIG. 1 is a cross sectional view schematically illustrating an electrolytic capacitor of Embodiment 1 and Embodiment 2 of the present invention.
Figure 2:
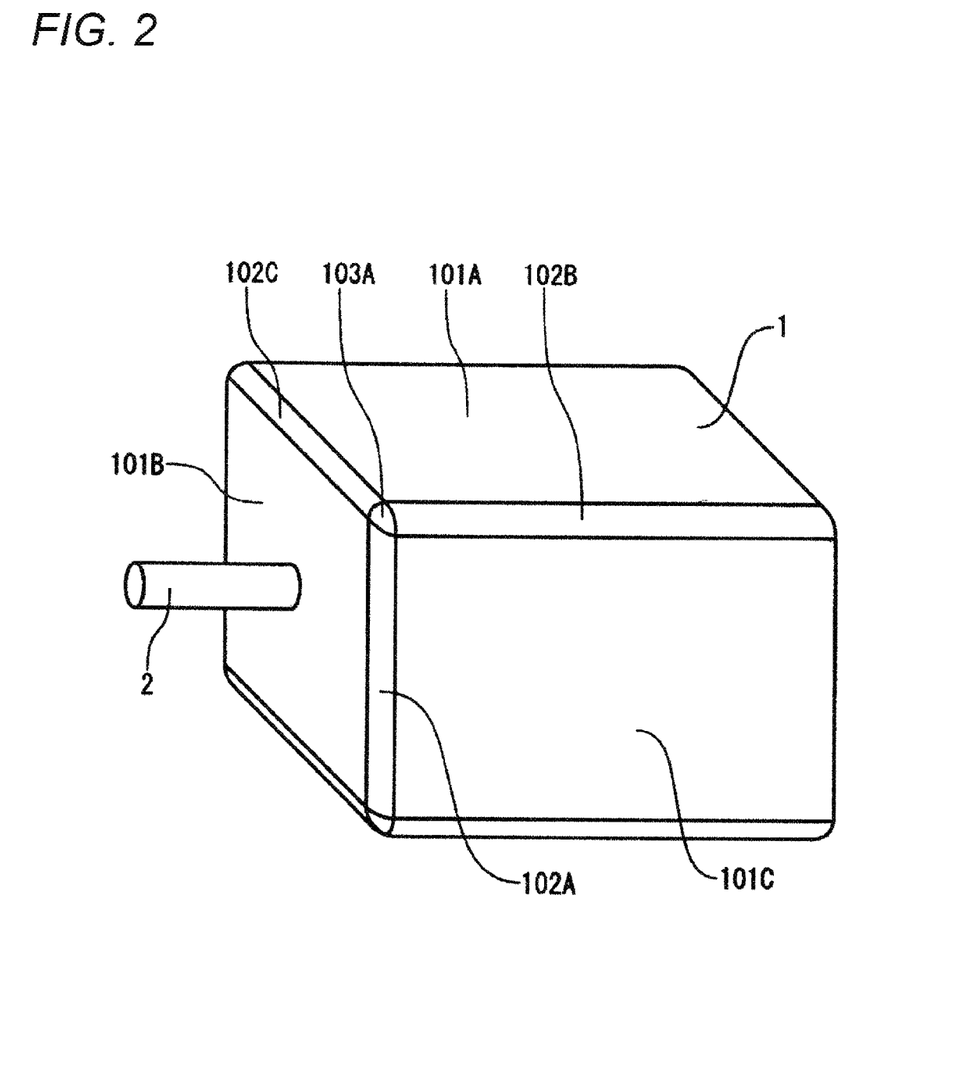
FIG. 2 is a perspective view schematically illustrating an example of the anode body of Embodiment 1 of the present invention.
Figure 3:
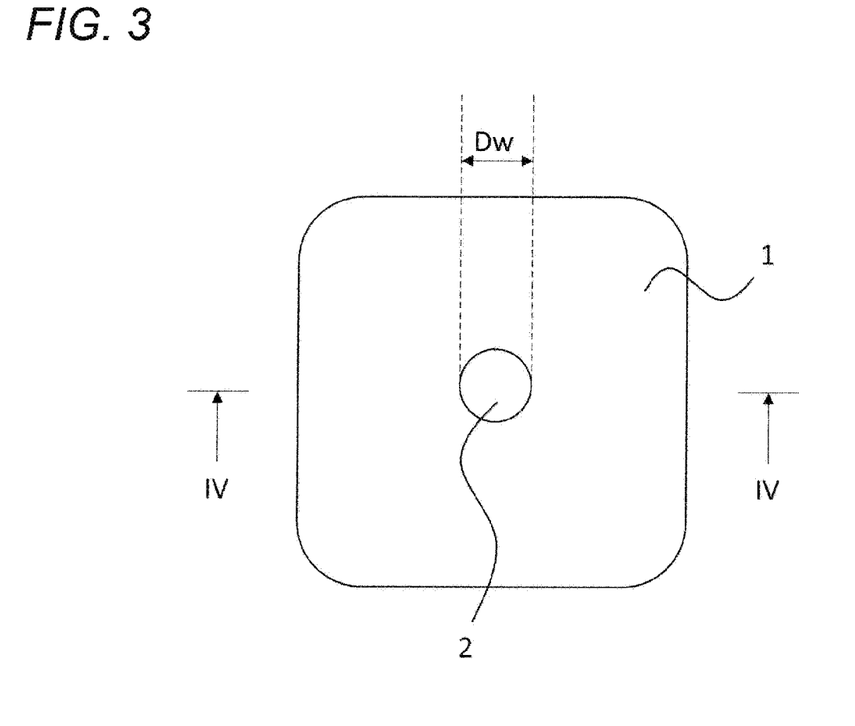
FIG. 3 is a front view of the anode body of Embodiment 1 of the present invention.
Figure 4:
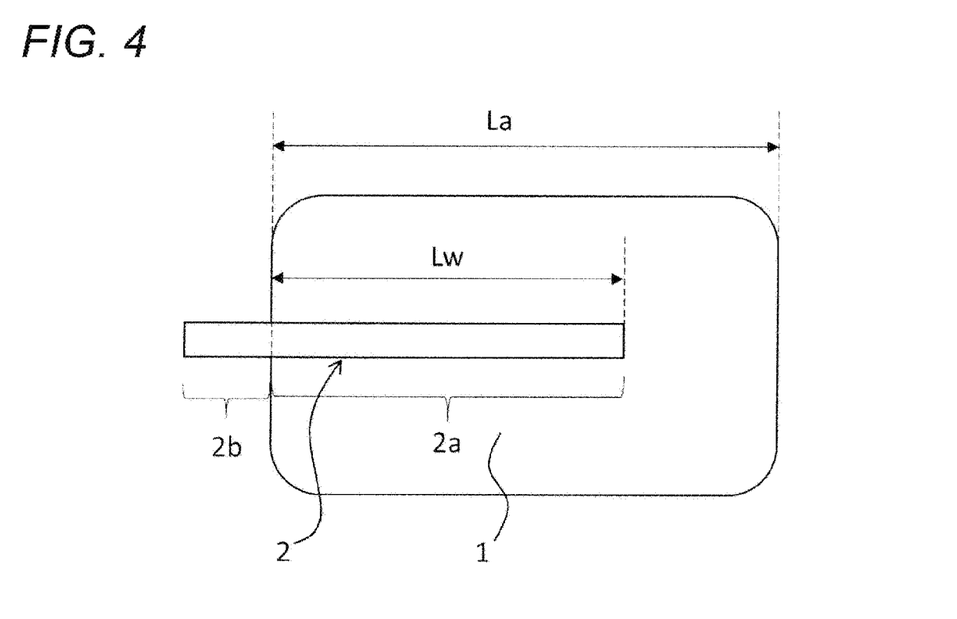
FIG. 4 is a cross sectional view along line IV-IV of the anode body in FIG. 3.

FIG. 1 is a cross sectional view schematically illustrating an electrolytic capacitor of the embodiment. FIG. 2 is a perspective view schematically illustrating an example of the anode body of the embodiment. FIG. 3 is a front view of the anode body of the embodiment, and FIG. 4 is a cross sectional view along line IV-IV of the anode body of FIG. 3.

An electrolytic capacitor 20 includes a capacitor element 10 having an anode portion 6 and a cathode portion 7, an outer resin 11 that seals the capacitor element 10, an anode lead terminal 13 electrically connected to the anode portion 6 with a portion thereof exposed from the outer resin 11, and a cathode lead terminal 14 electrically connected to the cathode portion 7 with a portion thereof exposed from the outer resin 11. The anode portion 6 has an anode body 1 and an anode wire 2. The anode lead terminal 13 is joined to the anode wire 2. The joint portion 14a of the cathode lead terminal 14 disposed inside the outer resin 11 is joined to the cathode layer 5 through an electrically conductive member 8.

A dielectric layer 3 is formed on the anode body surface. The cathode portion 7 has a solid electrolyte layer 4 covering at least a portion of the dielectric layer 3, and a cathode layer 5 covering a surface of the solid electrolyte layer 4. The cathode layer 5 has a carbon layer 5a formed to cover the solid electrolyte layer 4, and a metal paste layer 5b formed on the surface of the carbon layer 5a. The carbon layer 5a includes an electrically conductive carbon material such as graphite and resin. The metal paste layer 5b includes, for example, metal particles (e.g., silver) and resin. The configuration of the cathode layer 5 is not limited to this configuration. The cathode layer 5 having current collection functions will suffice.

The anode body 1 has generally a cuboid shape, and six main surfaces 101A to 101F are exposed. 101D to 101F are not shown, because they are at positions hidden from the plane of the sheet. A portion of the anode wire 2 is extended from the main surface 101B of the anode body 1. The anode wire 2 has a first portion 2a embedded from a side of the anode body 1 to inside the anode body 1, and a second portion 2b extended from the above-described side of the anode body 1. The second portion 2b is joined to the anode lead terminal 13 by welding and the like. The welding method is not particularly limited, and electric resistance welding or laser welding may be used.

In the main surfaces 101A to 101F, connection surfaces are formed by cutting out corners of edge portions, around edges where two adjacent main surfaces cross. In the example of FIG. 2, a connection surface 102C is interposed between the main surfaces 101A and 101B, a connection surface 102A is interposed between the main surfaces 101B and 101C, and a connection surface 102B is interposed between the main surfaces 101A and 101C. Also, second connection surfaces are formed by cutting out the corner of the vortex portion, near the vortex where three main surfaces meet. In the example of FIG. 2, a second connection surface 103A is present at a vertex where the main surfaces 101A to 101C meet. The second connection surface 103A connects the connection surfaces 102A to 102C to each other. The connection surfaces 102A to 102C and the second connection surface 103A are processed to have a curved face. The connection surfaces 102A to 102C and the second connection surface 103A may be formed of a curved face, or may be formed of one or more flat surfaces (e.g., corners are removed).

In this manner, with the anode body 1 having a shape with pointy portions removed, a dielectric layer with fewer defects can be formed on the surface of the anode body 1. As a result, the leak current can be reduced. Also, the mechanical strength of the anode body is increased, and concentration of thermal stress is relieved. As a result, damages to the dielectric layer are suppressed, increase in leak current from damages to the dielectric layer is suppressed, and leak current can be kept low.

The anode wire 2 has a diameter Dw of, for example, 0.3 mm or more and 1.0 mm or less. In view of reducing the ESR, the anode wire 2 has preferably a larger diameter Dw. However, as described, with a larger diameter Dw, production costs of the electrolytic capacitor tend to increase, and processability tends to decrease. When the anode wire 2 has a diameter Dw of 1.0 mm or less, processing load of the anode wire 2 and increase in the material costs can be suppressed, and therefore increase in production costs can be suppressed. Meanwhile, when the anode wire 2 has a diameter Dw of 0.3 mm or more, sufficiently low ESR can be achieved, and sufficient mechanical strength can be secured. The anode wire 2 may have a diameter Dw of 0.4 mm or more and 0.8 mm or less, or 0.4 mm or more and 0.6 mm or less.

The diameter Dw can be determined as a diameter of an equivalent circle having the same area as that of a cross sectional area of a portion 2a embedded in the anode body 1 of the anode wire 2. The cross section of the anode wire 2 is a cross section perpendicular to the longitudinal direction of the anode wire 2. The equivalent circle can be measured at three random points of the portion 2a embedded in the anode body 1 of the anode wire 2, and averaged. The shape of the cross section of the anode wire 2 is not particularly limited, and it can be a circular, track (shape formed with parallel straight lines and two curved lines connecting the end portions of the straight lines), elliptical, rectangular, or polygonal shape.

The length Lw of the portion 2a embedded in the anode body 1 of the anode wire 2 is 10% or more and 80% or less of the length La of the anode body 1 along the longitudinal direction of the anode wire 2. In view of decreasing the ESR, a higher ratio of the length Lw to length La is preferable. However, with a higher ratio, production costs of the electrolytic capacitor tend to increase. By setting the ratio of the length Lw to length La to 80% or less, increase in material costs can be suppressed, and therefore increase in production costs can be suppressed. Meanwhile, when the ratio of the length Lw to length La is set to 10% or more, a sufficiently low ESR can be achieved. The ratio of the length Lw to length La may be 20% or more and 70% or less, or 20% or more and 50% or less.

Embodiment 2

Embodiment 2 of the present disclosure is described.
[Electrolytic Capacitor]
An electrolytic capacitor of Embodiment 2 of the present disclosure includes a capacitor element including a porous anode body, an anode wire partially embedded in the anode body, and a dielectric layer formed on a surface of the anode body, and a solid electrolyte layer covering at least a portion of the dielectric layer. The electrolytic capacitor may include an anode lead terminal and a cathode lead terminal electrically connected to the capacitor element, and an external resin disposed around the capacitor element. The capacitor element is divided into an anode portion and a cathode portion. The anode body and the anode wire form the anode portion. The anode lead terminal is connected to the anode wire. The solid electrolyte layer forms the cathode portion. The cathode portion may include a cathode layer covering at least a portion of the solid electrolyte layer. The cathode portion configuration is not particularly limited, and it may be a known cathode portion, or a cathode portion having a configuration equivalent thereto. The cathode lead terminal is connected to the cathode portion through an electrically conductive member. The shape and the size of the capacitor element are not particularly limited, and a known capacitor element or a capacitor element having a configuration equivalent thereto may be used.

(Anode Body)

The anode body may be the anode body of the above-described Embodiment 1.

(Anode Wire)

The anode wire is formed of metal. The anode wire is partially embedded in the anode body, and the remainder is projected from the anode body. The anode wire has a rod shape. The distal end of the anode wire projected from the anode body may have a cross sectional shape that is different from other portions.

The anode wire has a core part, and a surface layer portion covering at least a portion of a surface of the core part. In this embodiment, the metal forming the core part of the anode wire is defined as a second metal, and the second metal conductivity is named a conductivity S2. Also, the metal forming the surface layer portion of the anode wire is defined as a third metal, and the third metal conductivity is named a conductivity S3. That is, the core part is formed of the second metal, and the surface layer portion is formed of the third metal.

The second metal has a different composition from the first metal. The second metal may be composed of a single metal element, or may be composed of two or more constituting elements. The core part formed of the second metal may include a component other than the second metal, but for example, 90 mass % or more, or even 95 mass % or more of the core part is formed of the second metal.

The third metal has a different composition from the second metal. The third metal may be composed of a single metal element, or may be composed of two or more constituting elements. The surface layer portion formed of the third metal may include a component other than the third metal, but for example, 90 mass % or more, or even 95 mass % or more of the surface layer portion is formed of the third metal.

The third metal forming the surface layer portion includes a common constituting element with the first metal forming the anode body, or a constituting element capable of forming an all-proportional solid solution type alloy with the constituting element of the first metal. The constituting element of the third metal that is common to the first metal, and the constituting element of the third metal capable of forming an all-proportional solid solution type alloy with the first metal may be a valve metal element. That is, the portion of the anode wire that contacts the anode body includes a constituting element that is the same as that of the anode body, or is capable of forming an all-proportional solid solution type alloy with the anode body. Therefore, even when the first metal composition is different from the second metal composition, bonding strength between the anode body and anode wire can be increased. As a result, connection reliability at a boundary between the anode body and anode wire can be increased to reduce occurrence of leak current, and the ESR of the electrolytic capacitor can be decreased. The third metal composition may be the same as that of the first metal composition. The element capable of forming an all-proportional solid solution type alloy is an element capable of forming a solid solution at an arbitrary ratio. A combination of valve metal elements capable of forming an all-proportional solid solution type alloy is, for example, niobium and tantalum. By including a valve metal element in the third metal, the leak current at the anode wire surface can be suppressed even more.

The surface layer portion does not refer to a partial structure formed by diffusion welding at a portion of the anode wire contacting the anode body. The anode body is porous, and is a sintered product of a molded body of particles, and therefore a portion of the anode wire contacting the anode body is determined randomly. Thus, the surface layer portion preferably covers more portions of the core part as much as possible. The surface layer portion may be formed so as to cover 90% or more of the area of the surface of the core part. In this case, arbitrary portions of the anode wire do not contact the anode body, but the surface layer portion is provided also at a portion not contacting the anode body.

The surface layer portion has a thickness of, for example, 0.01 µm or more and 850 µm or less, or 0.1 µm or more and 550 µm or less. In this case, bonding strength between the anode body and anode wire can be increased even more. As a result, the leak current and ESR of the electrolytic capacitor can be reduced even more significantly. The surface layer portion thickness can be determined by performing measurement at three random positions at three cross sections perpendicular to the longitudinal direction of the anode wire, and averaging the nine measurement values. The surface layer portion thickness can also be calculated from the volume ratio (i.e., ratio of the area of materials in cross sectional area of anode wire) of the materials of the surface layer portion and the materials of the core part in the anode wire.

Here, "first metal composition and second metal composition are different" means that the constituting element and the content of the first metal do not match the constituting element and the content of the second metal. That is, when "different composition from", it includes a case where the constituting element of the first metal does not match the constituting element of the second metal (not overlapping, but complete match), and a case where the constituting element of the first metal matches the constituting element of the second metal but the amount of the constituting element contained in the first metal is different from the amount of the constituting element contained in the second metal.

Similarly, "second metal composition and third metal composition are different" means that the constituting element and the content of the second metal do not match the constituting element and the content of the third metal. That is, when "different composition from", it includes a case where the constituting element of the second metal does not match the constituting element of the third metal (not overlapping, but complete match), and a case where the constituting element of the second metal matches the constituting element of the third metal but the amount of the constituting element contained in the second metal is different from the amount of the constituting element contained in the third metal.

The second metal forming the core part of the anode wire may have a conductivity S2 larger than the conductivity S1 of the first metal forming the anode body (S2>S1). With S2>S1, the ESR of the electrolytic capacitor significantly decreases. Also, with S2>S1, material costs of the anode wire can be suppressed, and processing (cutting, compressing, etc.) loads can be reduced. Thus, productivity of the electrolytic capacitor improves. That is, with S2>S1, while suppressing increase in the production costs of the electrolytic capacitor, an electrolytic capacitor with a low ESR can be provided.

The ESR can be reduced also with a thicker anode wire. However, with a thicker anode wire, in addition to higher material costs, processing load of the anode wire increases even more, and productivity of the electrolytic capacitor is reduced.

Also, with a longer length of the length Lw of the portion of the anode wire embedded in the anode body, the ESR can be reduced. However, in that case, the anode wire has to be formed to be even longer, which increases the material costs.

The ratio of the conductivity S2 to conductivity S1: S2/S1 may be, for example, 1.5 or more, 2.0 or more, or 2.4 or more. With a larger S2/S1, the ESR of the electrolytic capacitor can be easily reduced. Also, by making the anode wire even thinner, or shorter, the productivity of the electrolytic capacitor can be easily improved.

For the second metal, various kinds of metal can be used, and for example, the above-described valve metal, tungsten (W), molybdenum (Mo), copper (Cu), nickel (Ni), silver (Ag), and gold (Au) are used. In particular, for the second metal, at least one of W and Mo is preferably used, and at least W is used preferably. 50 mass % or more of the anode wire core part may be W, 70 mass % or more, or even 80 mass % or more of the anode wire core part may be W, or the anode wire core part may be entirely W other than impurities. W is low in cost, and a highly conductive thin wire can achieve a low ESR, and therefore processing load can be made small. The second metal may be an alloy of W and Mo.

In a preferable embodiment, the first metal includes at least Ta and the second metal includes at least W. The conductivity of W is at least two times bigger than that of Ta. By combining the anode body including Ta with the anode wire including W, the ESR can be significantly reduced. The anode wire including W also contributes to achieving a high capacity electrolytic capacitor. In a preferable embodiment, the anode portion in which 90 mass % or more of the anode body is formed with Ta, and 90 mass % or more of the core part of the anode wire is formed with W is used. W is low in costs more significantly compared with Ta, and the processing load can be reduced more easily than Ta.

The second metal may have a melting point of 1500° C. or more. In this manner, deformation from heat of the anode wire can be suppressed. In the anode body production process, the temperature for sintering the molded body of particles is, for example, 1450° C. or less.

The second metal forming the core part of the anode wire may have a conductivity S2 larger than the conductivity S3 of the third metal forming the surface layer portion of the anode wire (S2>S3). The surface layer portion may be oxidized with an external energy, and the electrical conductivity may reduce. Even in such a case, with the configuration of S2>S3, reduction in conductivity in the entire anode wire can be suppressed. Thus, with the above-described configuration, the ESR of electrolytic capacitors is significantly reduced. However, it may be S2 S3.

Setting the ratio of the conductivity S2 to conductivity S3: S2/S3 as A, the ratio of the core part diameter Dc to anode wire diameter Dw: Dc/Dw may satisfy $(1/2A)^{1/2}$ or more. Here, A may be, for example, 1.05 or more and 100 or less, or 1.1 or more and 20 or less. In this case, when the core part diameter Dc is a predetermined size or more, the conductivity of the anode wire as a whole is sufficiently high and processability and reliability of the anode wire can be sufficiently improved. When A is small, Dc can be made large to increase the volume of the core part in the anode wire as a whole. Meanwhile, when A is large, Dc can be made small to decrease the volume of the core part in the anode wire as a whole. When S2>S3, with the above configuration, compared with the case where the wire entirely is formed of only the third metal with the conductivity S3, the conductivity can be sufficiently improved. Thus, the ESR of the electrolytic capacitor significantly reduced.

The constituting element of the second metal and the constituting element of the third metal may be capable of forming an all-proportional solid solution type alloy. In this case, the bond between the anode body and anode wire can be made strong easily. The stronger bond between the anode body and anode wire is advantageous in reduction in the ESR. The solid solution is formed when the molded body of particles is sintered in the anode body production process.

The surface layer portion may be formed by covering the member (core part) surface of wire formed of the second metal with the third metal. Examples of the covering method include liquid phase methods such as electrolytic plating and electroless plating, and gas phase methods such as vapor deposition, and sputtering. However, the forming method of the surface layer portion is not particularly limited, and the anode wire having the core part and surface layer portion may be formed by any method.

Figure 7:
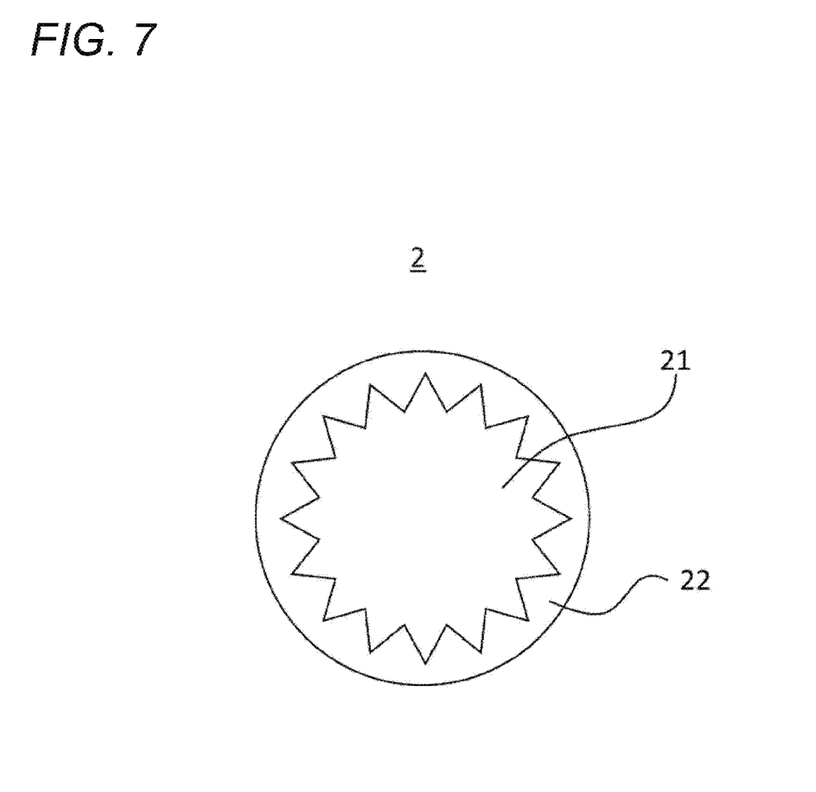
FIG. 7 is a vertical cross sectional view perpendicular to the longitudinal direction of an example of the anode wire.

The interface between the core part and surface layer portion may be roughened (ref: FIG. 7). In this manner, the contact resistance between the core part and surface layer portion is reduced, and connection reliability between the anode body and anode wire improves. Thus, leak current is suppressed even more significantly, and a smaller ESR can be easily achieved.

Here, the arithmetic average roughness Ra at the interface between the core part and surface layer portion may be, for example, 0.01 μm or more and 100 μm or less, 0.04 μm or more and 50 μm or less. The arithmetic average roughness Ra can be determined by determining the average line of tracks of the interface at three cross sections perpendicular to the longitudinal direction of the anode wire based on JIS B0601-1994, measuring Ra from the average line, and averaging the three measured values.

The method for roughing the interface between the core part and surface layer portion is not particularly limited, and the surface of the wire member (core part) formed of the second metal before forming the surface layer portion can be subjected to blast processing, or the core part surface can be plated, or the core part surface can be etched. In the blast processing, abrasive material particles are blasted to the core part surface with compressed air; in plating, metal particles are deposited on the core part surface; and in etching, the core part surface is partially removed by wet etching, dry etching, etc.

Examples of the third metal include metals exemplified for the first metal. In particular, for the third metal, at least one of Ta and Nb is used, or more preferably at least Ta is used. 50 mass % or more of the surface layer portion may be Ta, 70 mass % or more, or 80 mass % or more of the surface layer portion may be Ta, or the surface layer portion may be entirely Ta other than impurities.

The third metal may include metals exemplified for the second metal. Specifically, third metal may include at least one of Ta and Nb, and at least one of W and Mo. For example, the third metal is an alloy including Ta and W.

In a preferable embodiment, the first metal includes at least Ta, the second metal includes at least W, and the third metal includes at least Ta. In a preferable embodiment, an anode portion in which 90 mass % or more of the anode body is formed of Ta, 90 mass % or more of the core part of the anode wire is formed of W, and 90 mass % or more of the surface layer portion of the anode wire is formed of Ta is used. In this manner, while using W greatly lower in cost and having excellent processability than Ta, an anode portion with excellent bonding strength between the anode body and anode wire can be produced.

In another preferable embodiment, the first metal includes at least Nb and the third metal includes at least Ta. In a more preferable embodiment, an anode portion in which 90 mass % or more of the anode body is formed of Nb, 90 mass % or more of the core part of the anode wire is formed of W, and 90 mass % or more of the surface layer portion of the anode wire is formed of Ta is used.

(Dielectric Layer)

The dielectric layer may be the above-described dielectric layer of Embodiment 1.

(Electrolyte Layer)

The electrolyte layer may be the above-described electrolyte layer of Embodiment 1.

(Cathode Layer)

The cathode layer may be the above-described cathode layer of Embodiment 1.

(Electrically Conductive Member)

The electrically conductive member may be the above-described electrically conductive member of Embodiment 1.

(Outer Resin)

The outer resin may be the above-described outer resin of Embodiment 1.

(Cathode Lead Terminal)

The cathode lead terminal may be the above-described cathode lead terminal of Embodiment 1.

(Anode Lead Terminal)

The anode lead terminal may be the above-described anode lead terminal of Embodiment 1.

Figure 5:
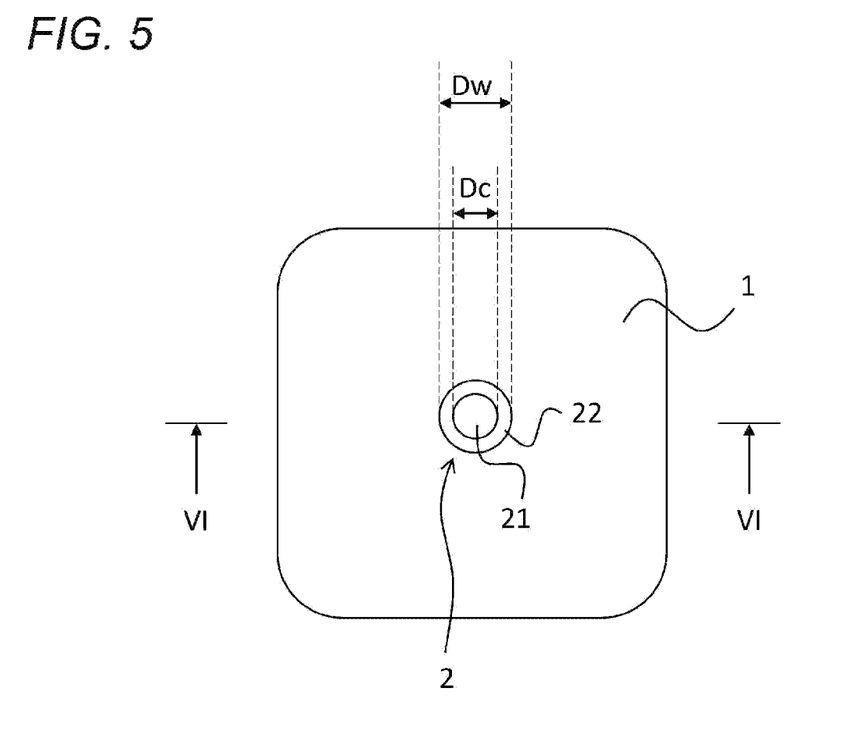
FIG. 5 is a front view of the anode body of Embodiment 2 of the present invention.
Figure 6:
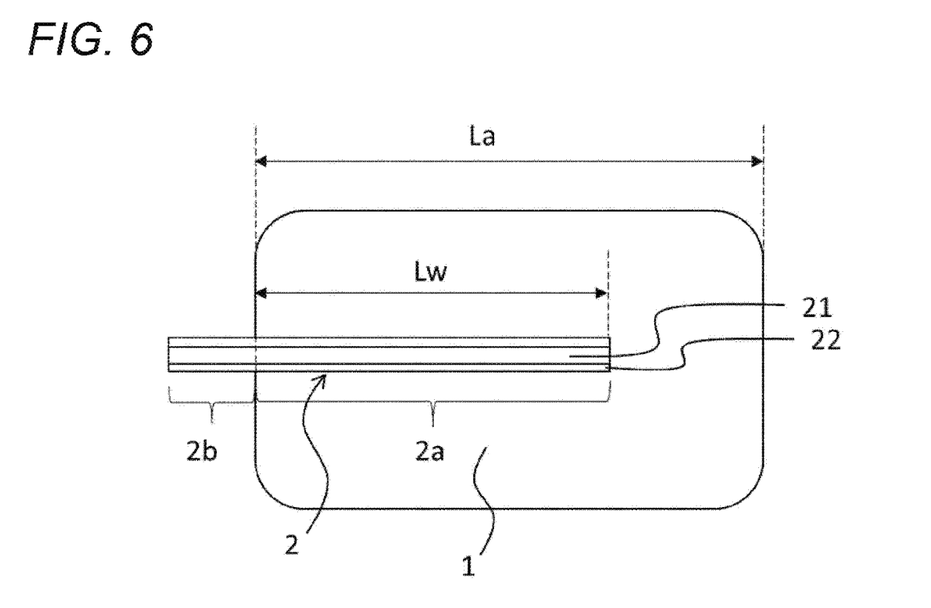
FIG. 6 is a cross sectional view along line VI-VI of the anode body in FIG. 5.

FIG. 1 is a cross sectional view schematically illustrating an electrolytic capacitor of this embodiment. FIG. 2 is a perspective view schematically illustrating an example of the anode body of the embodiment. FIG. 5 is a front view of the anode body of this embodiment, and FIG. 6 is s cross sectional view along line VI-VI of the anode body of FIG. 5.

An electrolytic capacitor 20 includes a capacitor element 10 having an anode portion 6 and a cathode portion 7, an outer resin 11 that seals the capacitor element 10, an anode lead terminal 13 electrically connected to the anode portion 6 with a portion thereof exposed from the outer resin 11, and a cathode lead terminal 14 electrically connected to the cathode portion 7 with a portion thereof exposed from the outer resin 11. The anode portion 6 has an anode body 1 and an anode wire 2. The anode lead terminal 13 is joined to the anode wire 2. The joint portion 14a of the cathode lead terminal 14 disposed inside the outer resin 11 is joined to the cathode layer 5 through an electrically conductive member 8. The anode wire 2 has a core part 21, and a surface layer portion 22 covering at least a portion of a surface of the core part 21.

A dielectric layer 3 is formed on the anode body surface. The cathode portion 7 has a solid electrolyte layer 4 covering at least a portion of the dielectric layer 3, and a cathode layer 5 covering a surface of the solid electrolyte layer 4. The cathode layer 5 has a carbon layer 5a formed to cover the solid electrolyte layer 4, and a metal paste layer 5b formed on the surface of the carbon layer 5a. The carbon layer 5a includes an electrically conductive carbon material such as graphite and resin. The metal paste layer 5b includes, for example, metal particles (e.g., silver) and resin. The configuration of the cathode layer 5 is not limited to this configuration. The cathode layer 5 having current collection functions will suffice.

The anode body 1 has generally a cuboid shape, and six main surfaces 101A to 101F are exposed. 101D to 101F are not shown, because they are at positions hidden from the plane of the sheet. A portion of the anode wire 2 is extended from the main surface 101B of the anode body 1. The anode wire 2 has a first portion 2a embedded from a side of the anode body 1 to inside the anode body 1, and a second portion 2b extended from the above-described side of the anode body 1. The second portion 2b is joined to the anode lead terminal 13 by welding and the like. The welding method is not particularly limited, and electric resistance welding or laser welding may be used.

In the main surfaces 101A to 101F, connection surfaces are formed by cutting out corners of edge portions, around edges where two adjacent main surfaces cross. In the example of FIG. 2, a connection surface 102C is interposed between the main surface 101A and 101B, a connection surface 102A is interposed between the main surface 101B and 101C, and a connection surface 102B is interposed between the main surface 101A and 101C. Also, second connection surfaces are formed by cutting out the corner of the vertex portion, near the vertex where three main surfaces meet. In the example of FIG. 2, a second connection surface 103A is present at a vertex where the main surfaces 101A to 101C meet. The second connection surface 103A connects the connection surfaces 102A to 102C to each other. The connection surfaces 102A to 102C and the second connection surface 103A are processed to have a curved face. The connection surfaces 102A to 102C and the second connection surface 103A may be formed of a curved face, or may be formed of one or more flat surfaces (e.g., corners are removed).

In this manner, with the anode body 1 having a shape with pointy portions removed, a dielectric layer with fewer defects can be formed on the surface of the anode body 1. As a result, the leak current can be reduced. Also, the mechanical strength of the anode body is increased, and concentration of thermal stress is relieved. As a result, damages to the dielectric layer are suppressed, increase in leak current from damages to the dielectric layer is suppressed, and leak current can be kept low.

The anode wire 2 has a diameter Dw of, for example, 0.3 mm or more and 1.0 mm or less. In view of reducing the ESR, the anode wire 2 has preferably a larger diameter Dw. However, as described, with a larger diameter Dw, production costs of the electrolytic capacitor tend to increase, and processability tends to decrease. When the anode wire 2 has a diameter Dw of 1.0 mm or less, processing load of the anode wire 2 and increase in the material costs can be suppressed, and therefore increase in production costs can be suppressed. Meanwhile, when the anode wire 2 has a diameter Dw of 0.3 mm or more, sufficiently low ESR can be achieved, and sufficient mechanical strength can be secured. The anode wire 2 may have a diameter Dw of 0.4 mm or more and 0.8 mm or less, or 0.4 mm or more and 0.6 mm or less. Meanwhile, the diameter Dc of the core part can be determined so as to satisfy, for example, as described, $Dc/Dw \geq (1/2A)^{1/2}$.

The diameter Dw of the anode wire 2 and the diameter Dc of the core part 21 can be determined as a diameter of an equivalent circle having the same area as that of a cross sectional area of a portion 2a of the anode wire 2 embedded in anode body 1 and the core part 21 of the portion. The cross section of the anode wire 2 is a cross section perpendicular to the longitudinal direction of the anode wire 2. The equivalent circle can be measured at three random points of the portion 2a embedded in the anode body 1 of the anode wire 2, and averaged. The shape of the cross section of the anode wire 2 is not particularly limited, and it can be a circular, track (shape formed with parallel straight lines and two curved lines connecting the end portions of the straight lines), elliptical, rectangular, or polygonal shape. The shape of the cross section of the core part 21 (i.e., track of interface between core part and surface layer portion) is not particularly limited, and it can be circular, track shape (shape formed with parallel straight lines and two curved lines connecting the end portions of the straight lines), elliptical, rectangular, or polygonal, or it can be roughened, as shown in FIG. 7.

The length Lw of the portion 2a of the anode wire 2 embedded in the anode body 1 may be 10% or more and 80% or less of the length La of the anode body 1 along the longitudinal direction of the anode wire 2. In view of decreasing the ESR, a higher ratio of the length Lw to the length La is preferable. However, with a higher ratio, production costs of the electrolytic capacitor tend to increase. By setting the ratio of the length Lw to the length La to 80% or less, increase in material costs can be suppressed, and therefore increase in production costs can be suppressed. Meanwhile, when the ratio of the length Lw to length La is set to 10% or more, a sufficiently low ESR can be achieved. The ratio of the length Lw to length La may be 20% or more and 70% or less, or 20% or more and 50% or less.

<Notes>

Description above also includes features noted below.

(Note 1)

An electrolytic capacitor including a capacitor element including a porous anode body,
  an anode wire partially embedded in the anode body,
  a dielectric layer formed on a surface of the anode body, and
  a solid electrolyte layer covering at least a portion of the dielectric layer, wherein
  the anode body is formed of a first metal,
  the anode wire has a core part and a surface layer portion covering at least a portion of a surface of the core part,
  the core part is formed of a second metal having a different composition from the first metal,
  the surface layer portion is formed of a third metal having a different composition from the second metal, and
  the third metal includes a common constituting element with the first metal, or a constituting element capable of forming an all-proportional solid solution type alloy with the constituting element of the first metal.

(Note 2)

The electrolytic capacitor described in note 1, wherein the constituting element of the third metal common to the first metal, and the constituting element of the third metal that is capable of forming an all-proportional solid solution type alloy with the first metal is a valve metal element.

(Note 3)

The electrolytic capacitor described in note 1 or 2, wherein the second metal has a conductivity S2 larger than a conductivity S1 of the first metal.

(Note 4)

The electrolytic capacitor described in any one of notes 1 to 3, wherein the thickness of the surface layer portion is 0.01 μm or more and 850 μm or less.

(Note 5)

The electrolytic capacitor described in any one of notes 1 to 4, wherein the second metal has a conductivity S2 larger than a conductivity S3 of the third metal.

(Note 6)

The electrolytic capacitor described in note 5, wherein when a ratio of the conductivity S2 to the conductivity S3: S2/S3 is set to A, a ratio of the core part diameter Dc to the anode wire diameter Dw: Dc/Dw is $(1/2A)^{1/2}$ or more.

(Note 7)

The electrolytic capacitor described in any one of notes 1 to 6, wherein the anode wire has a diameter Dw of 0.3 mm or more and 1.0 mm or less.

(Note 8)

The electrolytic capacitor described in any one of notes 1 to 7, wherein a length Lw of a portion of the anode wire embedded in the anode body is 10% or more and 80% or less of a length La of the anode body in a longitudinal direction of the anode wire.

(Note 9)

The electrolytic capacitor described in any one of notes 1 to 8, wherein an interface between the core part and the surface layer portion is roughened.

(Note 10)

The electrolytic capacitor described in any one of notes 1 to 9, wherein the second metal has a melting point of 1500° C. or more.

(Note 11)

The electrolytic capacitor described in any one of notes 1 to 10, wherein the first metal includes at least one of tantalum and niobium.

(Note 12)

The electrolytic capacitor described in any one of notes 1 to 11, wherein the second metal includes at least one of tungsten and molybdenum.

(Note 13)

The electrolytic capacitor described in any one of notes 1 to 12, wherein the third metal includes at least one of tantalum and niobium.

(Note 14)

The electrolytic capacitor described in any one of notes 1 to 13, wherein the third metal includes at least one of tantalum and niobium and at least one of tungsten and molybdenum.

(Note 15)

The electrolytic capacitor described in any one of notes 1 to 14, wherein the first metal includes at least tantalum,
  the second metal includes at least tungsten, and
  the third metal includes at least tantalum.

(Note 16)

The electrolytic capacitor described in any one of notes 1 to 14, wherein the first metal includes at least niobium, and
  the third metal includes at least tantalum.

(Note 17)

The electrolytic capacitor described in any one of notes 1 to 16, wherein the solid electrolyte layer includes a conductive polymer.

EXAMPLES

In the following, the present invention will be described in detail with reference to Examples and Comparative Examples. The present invention, however, is not limited to the following.

Examples 1 to 20

20 electrolytic capacitors (rated voltage 4 V, electrostatic capacity 470 μF) as shown in FIG. 1 were made as described below, and their characteristics were evaluated.

(i) Production of Capacitor Element
(i-i) Production of Anode Body

For the anode body material, Ta particles were used. For the anode wire, a tungsten (W) wire was used. One end of the W wire was embedded in the Ta particles, and the Ta particles were molded into a cuboid, and thereafter, the molded body was sintered under vacuum. An anode body (i.e., anode portion) composed of the sintered product of porous Ta with a portion of the W wire embedded was produced in this manner. The W wire diameter Dw was changed as shown in Table 1. The ratio of the length Lw of the portion 2a of the W wire embedded in the anode body to the length La of the anode body (Lw/La ratio) was changed as shown in Table 1.

TABLE 1

| Capacitor | Dw (mm) | Lw/La ratio | | | |
|---|---|---|---|---|---|
| | | 10% | 25% | 50% | 75% |
| X11~X14 | 0.5 | 97 | 93 | 91 | 90 |
| X21~X24 | 0.6 | 94 | 91 | 89 | 88 |
| X31~X34 | 0.8 | 91 | 88 | 85 | 84 |
| X41~X44 | 1.0 | 89 | 86 | 83 | 82 |
| X51~X54 | 1.2 | 88 | 85 | 81 | 79 |

(i-ii) Formation of Dielectric Layer

The anode body and a portion of the W wire were immersed in an anodizing vessel filled with a phosphoric acid aqueous solution, i.e., an electrolytic aqueous solution, to perform anodizing, thereby forming a homogenous oxide film on the anode body surface and the surface of the portion of the W wire, as a dielectric layer. The anodizing was performed in a 0.1 mass % phosphoric acid aqueous solution at an anodizing voltage of 10 V and at a temperature of 60° C. for 10 hours.

(i-iii) Formation of Solid Electrolyte Layer

A solid electrolyte layer composed of a conductive polymer was formed on the anode body with the dielectric layer formed. First, a precoat layer including polypyrrole was thinly formed with a chemical polymerization method on the dielectric layer surface. Then, on the precoat layer surface, a conductive polymer layer including polypyrrole was formed by using an electropolymerization method.

(i-iv) Formation of Carbon Layer

A dispersion liquid of carbon particles (carbon paste) was applied to the solid electrolyte layer, and then heated at 200° C., thereby forming a carbon layer (thickness about 3 μm) on a surface of the solid electrolyte layer.

(i-v) Formation of Metal Paste Layer

A metal paste including silver particles, a binder resin, and a solvent was applied to a surface of the carbon layer. Afterwards, heating at 200° C. was performed to form a metal paste layer (thickness 10 μm), thereby forming a capacitor element.

(ii) Production of Electrolytic Capacitor

An electrically conductive adhesive to be an electrically conductive member was applied to the metal paste layer, thereby joining the cathode lead terminal and metal paste layer. The W wire and the anode lead terminal was joined by resistance welding. Then, the capacitor element to which lead terminals are joined was sealed with an outer resin by a transfer molding, thereby forming electrolytic capacitors X11 to X14 of Examples 1 to 4, electrolytic capacitors X21 to X24 of Examples 5 to 8, electrolytic capacitors X31 to X34 of Examples 9 to 12, electrolytic capacitors X41 to X44 of Examples 13 to 16, and electrolytic capacitors X51 to X54 of Examples 17 to 20.

Comparative Example 1

For the anode wire, instead of the W wire, a Ta wire was used. The Ta wire had a diameter Dw=0.5 mm, and a Lw/La ratio=50%.

[Evaluation]

The ESR values of the electrolytic capacitors produced as described above were measured. An average value for 20 electrolytic capacitors was determined by using a 4-terminal measurement LCR meter under a 20° C. environment, and measuring the ESR value (me) at a frequency of 100 kHz. Table 1 shows the average value of the ESR of each of the electrolytic capacitors as a relative value, setting the average ESR value of the electrolytic capacitor Y of Comparative Example 1 as 100.

Table 1 shows that by using the W wire, compared with the case where the Ta wire is used, the ESR can be significantly reduced. Table 1 also shows that even when the W wire with a smaller Lw/La ratio is used, the ESR can be made smaller than the case where the Ta wire is used. The results show that when achieving the ESR of the same level as the case using the Ta wire, use of a thinner and shorter W wire is sufficient. Use of an even thinner W wire can decrease processing loads more than the Ta wire.

Also, with a larger diameter Dw, the ESR can be reduced even more significantly. W is greatly lower in costs than Ta, and even with a larger diameter Dw, the costs are lower than the case using Ta. Thus, even when a thicker or longer W wire is used, productivity of the electrolytic capacitor does not decline.

Examples 21 to 26

Using the anode wire having the configuration shown in Table 2 with a core part and a surface layer portion, electrolytic capacitors E1 to E6 of Examples 21 to 26 were produced. The anode wire had a diameter Dw=0.5 mm and a Lw/La ratio=50%. For the core part, W was used, and for the surface layer portion, Ta was used. In Example 26 (E6), Nb was used as the anode body material instead of Ta particles. Table 2 shows the average value of the ESR of each of the electrolytic capacitors as a relative value, setting the average ESR value of the electrolytic capacitor Y of Comparative Example 1 as 100.

The conductivities S2 and S3 are as shown below.

$$S2(W) = 1.82 \times 10^7 \, S/cm$$

$$S3(Ta) = 8.00 \times 10^6 \, S/cm$$

$$A = S2/S3 = 1.82 \times 10^7 / 8.00 \times 10^6 = 2.275$$

$$(1/2A)^{1/2} = 0.469$$

TABLE 2

| | Y | X13 | E1 | E2 | E3 | E4 | E5 | E6 |
|---|---|---|---|---|---|---|---|---|
| Dw (mm) | 0.5 | 0.5 | 0.5 | 0.5 | 0.5 | 0.5 | 0.5 | 0.5 |
| Anode | Ta | Ta | Ta | Ta | Ta | Ta | Ta | Nb |

TABLE 2-continued

|  |  | Y | X13 | E1 | E2 | E3 | E4 | E5 | E6 |
|---|---|---|---|---|---|---|---|---|---|
| Surface layer portion | Material | — | — | Ta | Ta | Ta | Ta | Ta | Ta |
|  | Thickness (μm) | 0 | 0 | 50 | 100 | 133 | 160 | 200 | 100 |
| Core part | Material | Ta | W | W | W | W | W | W | W |
|  | Dc(μm) | 500 | 500 | 400 | 300 | 235 | 180 | 100 | 300 |
| Dc/Dw |  | — | — | 0.8 | 0.6 | 0.47 | 0.36 | 0.2 | 0.6 |
| $(1/2A)^{1/2}$ |  | — | — | 0.469 | 0.469 | 0.469 | 0.469 | 0.469 | 0.469 |
| ESR relative value |  | 100 | 91 | 92 | 94 | 96 | 98 | 99 | 94 |

Table 2 shows that the electrolytic capacitors E1 to E6 of Examples have a low relative value of ESR compared with the electrolytic capacitor Y of Comparative Example 1. In particular, with E1 to E3 of Dc/Dw of $(1/2A)^{1/2}=0.469$ or more, the ESR was significantly low. However, as shown with E4 and E5, even when the core part diameter Dc was small, by using W for the core part, effects of decreasing the ESR are seen more than the case where the anode wire with Ta is used entirely.

Also, with the electrolytic capacitors E1 to E6, by using the anode wire composed of the core part and the surface layer portion, connection reliability at the interface between the anode body and anode wire is increased. That is, when the third metal is configured with a common constituting element with the first metal, or an element capable of forming an all-proportional solid solution type alloy, a strong metal bond is formed around the interface, which increases the connection reliability.

When the surface layer portion is not formed, and for example, tungsten (W), copper (Cu), and gold (Au) etc. are used for the anode wire, even though a voltage is applied to the wire after the dielectric formation step or electrolytic capacitor completion, oxide is not formed on the wire surface, or only an extremely thin oxide is formed, which increases the leak current. Meanwhile, when the surface layer portion is formed with a valve metal element such as tantalum (Ta), sufficient oxide can be formed on the surface layer portion. Thus, because the surface layer portion has a significantly high volume resistance, even when W, Cu, Au, and the like are used for the anode wire, the leak current can be made low significantly.

In E6 in which Nb was used instead of Ta as the anode body (sintered product), the results obtained were about the same as that of the case using Ta for the anode body.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The present disclosure can be used for an electrolytic capacitor including a porous anode body and an anode wire partially embedded in the anode body. The electrolytic capacitor of the present disclosure can be used for various applications where a low ESR is desired.

DESCRIPTION OF REFERENCE NUMERALS

20: electrolytic capacitor
10: capacitor element
1: anode body
2: anode wire
　2a: first portion
　2b: second portion
　　21: core part
　　22: surface layer portion
3: dielectric layer
4: solid electrolyte layer
5: cathode layer
　5a: carbon layer
　5b: metal paste layer
6: anode portion
7: cathode portion
8: electrically conductive member
11: outer resin
13: anode lead terminal
14: cathode lead terminal
　14a: joint portion
101A to 101C: anode body main surface
102A to 102C: connection surface
103A: second connection surface

The invention claimed is:

1. An electrolytic capacitor comprising a capacitor element including:
a porous anode body;
an anode wire partially embedded in the anode body;
a dielectric layer formed on a surface of the anode body; and
a solid electrolyte layer covering at least a portion of the dielectric layer, wherein;
the anode body is formed of a first metal,
the anode wire has a core part, and a surface layer portion covering at least a portion of a surface of the core part,
the core part is formed of a second metal having a different composition from the first metal,
the surface layer portion is formed of a third metal having a different composition from the second metal,
the third metal includes a common constituting element with the first metal, or a constituting element capable of forming an all-proportional solid solution type alloy with the constituting element of the first metal,
an interface between the core part and the surface layer portion is roughened, and
the second metal has a conductivity S2 that is larger than a conductivity S1 of the first metal.

2. The electrolytic capacitor of claim 1, wherein a ratio of the conductivity S2 to the conductivity S1: S2/S1 is 1.5 or more.

3. The electrolytic capacitor of claim 1, wherein the constituting element of the first metal and a constituting element of the second metal are capable of forming an all-proportional solid solution type alloy.

4. The electrolytic capacitor of claim 1, wherein the second metal has a melting point of 1500° C. or more.

5. The electrolytic capacitor of claim 1, wherein the anode wire has a diameter Dw of 0.3 mm or more and 1.0 mm or less.

6. The electrolytic capacitor of claim 1, wherein a length Lw of a portion of the anode wire embedded in the anode body is 10% or more and 80% or less of a length La of the anode body in a longitudinal direction of the anode wire.

7. The electrolytic capacitor of claim 1, wherein the first metal includes at least one of tantalum and niobium.

8. The electrolytic capacitor of claim 1, wherein the second metal includes at least one of tungsten and molybdenum.

9. The electrolytic capacitor of claim 1, wherein
the first metal includes at least tantalum, and
the second metal includes at least tungsten.

10. The electrolytic capacitor of claim 1, wherein the solid electrolyte layer includes a conductive polymer.

11. An electrolytic capacitor comprising a capacitor element including:
a porous anode body;
an anode wire partially embedded in the anode body;
a dielectric layer formed on a surface of the anode body; and
a solid electrolyte layer covering at least a portion of the dielectric layer, wherein:
the anode body is formed of a first metal,
the anode wire has a core part, and a surface layer portion covering at least a portion of a surface of the core part,
the core part is formed of a second metal having a different composition from the first metal,
the surface layer portion is formed of a third metal having a different composition from the second metal,
the third metal includes a common constituting element with the first metal, or a constituting element capable of forming an all-proportional solid solution type alloy with the constituting element of the first metal, and
an interface between the core part and the surface layer portion is roughened.

12. The electrolytic capacitor of claim 11, wherein the common constituting element of the third metal with the first metal, and the constituting element of the third metal capable of forming an all-proportional solid solution type alloy with the first metal are a valve metal element.

13. The electrolytic capacitor of claim 11, wherein the surface layer portion has a thickness of 0.01 μm or more and 850 μm or less.

14. The electrolytic capacitor of claim 11, wherein the second metal has a conductivity S2 larger than a conductivity S3 of the third metal.

15. The electrolytic capacitor of claim 14, wherein when a ratio of the conductivity S2 to the conductivity S3: S2/S3 is set to A, a ratio of the core part diameter Dc to the anode wire diameter Dw: Dc/Dw is $(1/2A)^{1/2}$ or more.

16. The electrolytic capacitor of claim 11, wherein the third metal includes at least one of tantalum and niobium.

17. The electrolytic capacitor of claim 11, wherein the third metal includes at least one of tantalum and niobium and at least one of tungsten and molybdenum.

18. The electrolytic capacitor of claim 11, wherein the first metal includes at least tantalum,
the second metal includes at least tungsten, and
the third metal includes at least tantalum.

19. An electrolytic capacitor comprising a capacitor element including:
a porous anode body;
an anode wire partially embedded in the anode body;
a dielectric layer formed on a surface of the anode body; and
a solid electrolyte layer covering at least a portion of the dielectric layer, wherein:
the anode body is formed of a first metal,
the anode wire has a core part, and a surface layer portion covering at least a portion of a surface of the core part,
the core part is formed of a second metal having a different composition from the first metal,
the surface layer portion is formed of a third metal having a different composition from the second metal,
the third metal includes a common constituting element with the first metal, or a constituting element capable of forming an all-proportional solid solution type alloy with the constituting element of the first metal,
the first metal includes at least niobium, and
the third metal includes at least tantalum.

* * * * *